Feb. 24, 1970  F. E. GERRARD  3,496,919
CARBURETOR AND SYSTEM FOR SUPPLYING VAPORIZED
FUEL TO COMBUSTION ENGINES
Filed Sept. 5, 1967
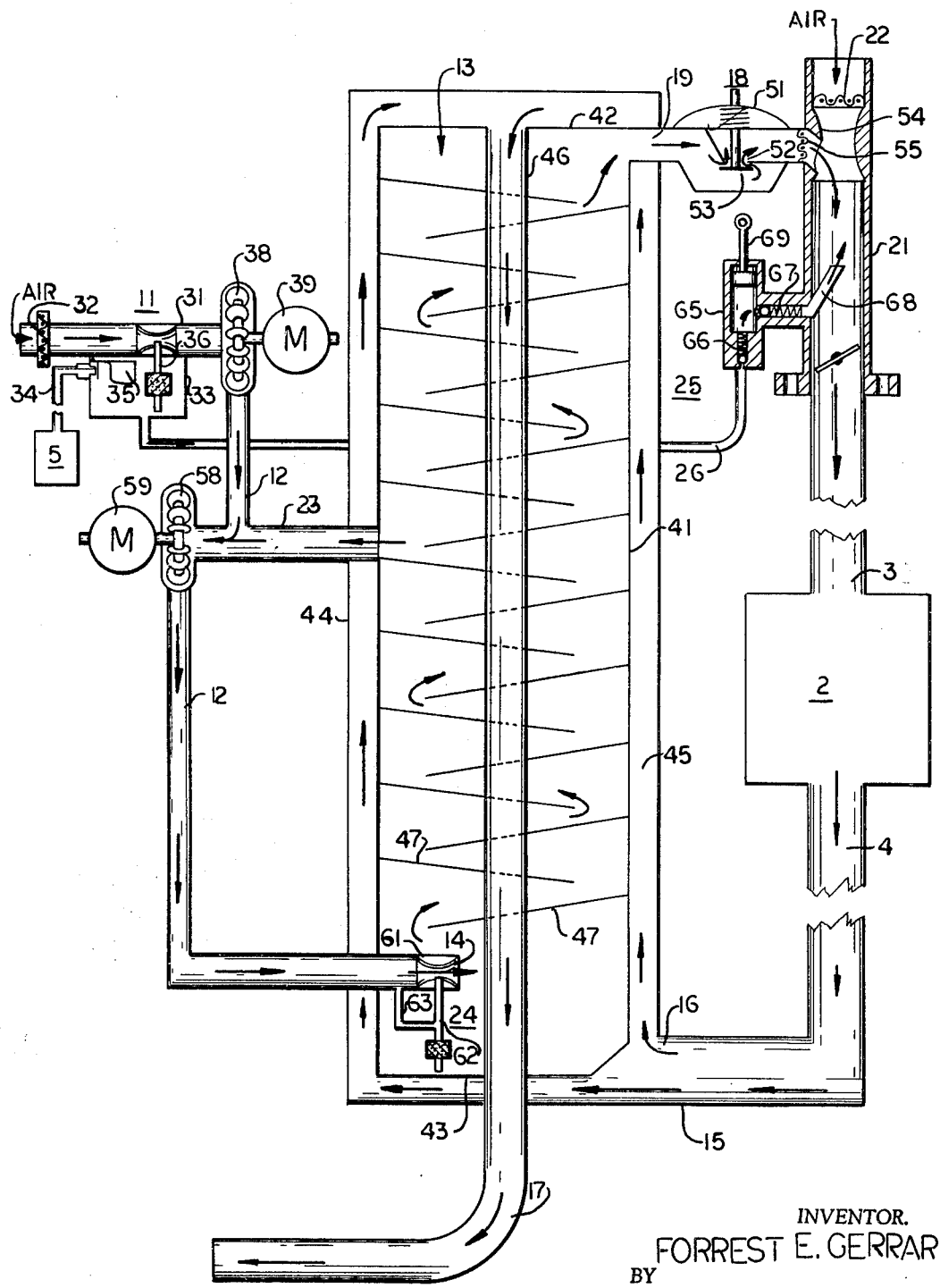
INVENTOR.
FORREST E. GERRARD
BY
McGrew & Edwards
ATTORNEYS

United States Patent Office

3,496,919
Patented Feb. 24, 1970

3,496,919
CARBURETOR AND SYSTEM FOR SUPPLYING VAPORIZED FUEL TO COMBUSTION ENGINES
Forrest E. Gerrard, 1070 S. Dudley St., Lakewood, Colo. 80226
Filed Sept. 5, 1967, Ser. No. 665,400
Int. Cl. F02m 31/04
U.S. Cl. 123—122          4 Claims

ABSTRACT OF THE DISCLOSURE

Carburetor for delivering fuel from a fuel tank to an engine combustion chamber in vaporized form. A vaporizing chamber has an inlet and outlet and internal surfaces in contact with a heat exchanger. The heat exchanger is connected to the exhaust gas conduit of the engine. A first conduit with an atomizer and impeller is connected to the inlet for introducing a fuel and air mixture thereto. A second conduit having a second impeller is connected to the first conduit at a point intermediate the vaporizer chamber inlet and outlet. The first conduit has an atomizer at the inlet which is disposed in the bottom of the vaporizer chamber. The interior space of the vaporizer chamber above the point of the second conduit being of sufficient volume to store all the vaporized portion of the mixture at the established pressures therein. A valve is connected to the outlet of the vaporizer chamber and is responsive to intake pressure of the engine for controlling withdrawal of the vaporized mixture through the outlet.

---

This invention relates to the delivery of fuel to an internal combustion engine and more particularly to a carburetor and system for supplying fuel in a vaporized form to the combustion chamber of an internal combustion engine.

Gasoline which is commonly in use as fuel for automobile engines is a liquid comprising a number of hydrocarbons having boiling points ranging from about 90° F. to 425° F. Those portions of the gasoline having the lower boiling point are commonly referred to as the lighter end or lighter fractions and those of the higher boiling point the heavier end or heavier fractions. Carburetors presently in use deliver much of the fuel and particularly that of the heavier fraction boiling point into the cylinder of the combustion chamber in an unvaporized condition and during the heat of combustion there is insufficient oxygen present to burn the fuel to release all of the energy stored in the fuel. As a result, a large portion of the energy contained in the fuel is not used and is passed out the exhaust pipe and wasted and the surrounding air is contaminated with these products of combustion.

In the practice of the present invention, both the lighter and heavier fractions of the fuel are vaporized by first passing them in heat exchange relation to an available heat supply before delivery to the combustion chamber and independently of the section of the engine cylinder so that a maximum amount of available energy is released from the gasoline and a lesser amount of combustible matter is released to the atmosphere.

An object of this invention is to improve the efficiency and operating cost of an internal combustion engine by providing a novel carburetor arrangement for delivering fuel in a vaporized condition to the engine in a condition to be substantially consumed therein.

Another object of this invention is to provide for the vaporization of both lighter and heavier fractions of the gasoline before it enters the combustion chamber.

Still another object of this invention is to provide simple, efficient and economical means for reducing the amount of pollutants which are discharged to the atmosphere from an internal combustion engine.

A further object of this invention is to provide a carburetor means for delivering fuel to an internal combustion engine which may be easily adapted to existing carburetion systems of current standard makes of present types of automobile engines.

Other objects, advantages and capabilities of the present invention will become more apparent as the following description proceeds taken in conjunction with the drawing in which:

The drawing is a schematic diagram of an arrangement embodying features of the present invention shown as coupled in flow relationship between a fuel tank and the throttle body and associated combustion chamber of an internal combustion engine.

Referring now to the drawing, a combustion chamber of an internal combustion engine designated 2 with a fuel intake 3 and exhaust discharge 4 and a fuel supply or tank 5 which are operatively associated with the arrangement of the present invention are illustrated schematically for purposes of explanation of the present invention but it is understood such components form no part thereof. This engine may be of various known types for different uses but the present invention is particularly suitable for use in conjunction with automobile engines because of the greatly improved efficiency attained by releasing more energy stored in the fuel and the reduction of the amount of discharge of products of combustion into the atmosphere attained thereby.

The arrangement illustrated in the drawing embodying features of the present invention will first be described generally by progressing from the fuel tank 5 to the engine 2 with the direction of flow indicated by arrows. The fuel supplied from the fuel tank 5 is first atomized or changed in an atomizer 11 to a mixture of small particles of fuel suspended in air in an induced air flow which is directed as an incoming fuel mixture along an intake conduit 12 through a fuel intake 14 into a vaporizing chamber 13. In the vaporizing chamber 13 the fuel mixture progresses upwardly in a sinuous flow in heat exchange relation with surfaces heated by the exhaust gases of the engine 2 which are conducted from the exhaust of the engine through a conduit 15, into a heat intake 16 passage extending lengthwise of chamber 13 and out a central heat discharge passage 17 so that portions of the fuel mixture absorb heat and are vaporized as they progress upwardly in chamber 13. A discharge control valve 18 is coupled between the vapor discharge 19 and a throttle body 21 having an air intake 22 coupled in flow relationship with the intake of the engine combustion chamber which selectively regulates the discharge of the vaporized fuel discharged from chamber 13 in accordance with the pressure in the combustion chamber.

Unvaporized portions of the fuel mixture are withdrawn from the vaporizing chamber in a recirculation cycle through a conduit 23 coupled between an intermediate portion of the vaporizing chamber and the intake conduit 12 and are returned or recirculated in an induced air flow to mix with the incoming fuel mixture in the intake conduit 12 prior to being delivered to the fuel intake 14 of the vaporizing chamber. Liquefied portions of the fuel which drain and settle in the bottom portion of the vaporizing chamber are reatomized in a second atomizer 24 associated with the induced air flow at the intake of the vaporizing chamber. A primer or pump 25 pumps fuel from the fuel tank through a line 26 into the throttle body 21 and engine combustion chamber 2 as required for furnishing additional fuel for starting and acceleration of the engine.

More specifically, the atomizer 11 includes a venturi tube 31 having a screened air intake 32 and a fuel reservoir 33 into which fuel is delivered from the tank by a line 34. A float 35 is associated with the discharge of this line for controlling the level of fuel in the reservoir. The fuel pipe 36 having restricted orifices in its upper end is disposed in an upright position in the reservoir 33 and extends from a submerged position in the fuel of the reservoir up through into the venturi tube so that when an induced air flow is produced in the tube fuel will be drawn up through the pipe and into the tube and discharged as minute particles of fuel suspended in air in an induced air flow in the venturi tube.

For producing an induced air flow in the venturi tube 31 and intake conduit 12 there is provided an impeller 38 disposed in a casing coupled in flow relation between the venturi tube 31 and conduit 12 which is mounted on the shaft of a drive 39, preferably an electric motor. Rotation of the impeller 38 at a constant speed produces a static pressure in intake conduit 12 and an air flow along conduit 12 for introducing the fuel mixture into the fuel intake 14 of the vaporizing chamber.

The vaporizing chamber 13 preferably will be disposed in an upright position and in practice preferably will be mounted adjoining the engine. As shown, chamber 13 includes upright sidewalls 41 and top and bottom walls 42 and 43 formed of a heat conductive material. The fuel intake 14 is disposed in a lower portion of the sidewall and the vapor discharge 19 in an upper portion of the opposite sidewall. An outer housing or jacket 44 fully encloses the inner chamber walls and is disposed in spaced relation thereto to form a heat passage 45 around the inner walls in flow communication with a tubular member 46 which terminates in the heat discharge 17 at its lower end. Tubular member 46 is disposed centrally in the inner chamber side wall and as shown forms an inner wall of the chamber and is of a heat conductive material so that the heated exhaust gases will circulate in heat exchange relation with the chamber walls along the bottom wall 43, upwardly around the sidewalls 41, over the top wall 42 and then downwardly through the central tubular member 46 and out the exhaust discharge 17 as shown by arrows.

The interior surface of the sidewalls is provided with a plurality of baffle members 47 which are secured at one sidewall and incline downwardly therefrom and terminate in spaced relation to the opposing sidewall to form passages which permit escape of elevating gases. These baffle members are supported from opposing sidewalls in an alternating pattern and are preferably imperforate so as to define a sinuous flow path for the fuel mixture as it progresses upwardly toward the vapor discharge 19, thereby providing a flow path of substantial length in a condensed space. In addition, the unvaporized fuel which is elevated and then liquefies at some stage in its progressive movement upwardly will drain down along these baffles, and eventually collects at the bottom of the chamber. In this manner, the heat absorbed by the walls 41, 42, and 43 and from the tubular member 46 will be transferred to the incoming fuel mixture which is forced into the chamber under pressure and will absorb heat so as to vaporize and then rise to the top of the chamber. This vaporized fuel is then stored in an upper portion of the chamber until being drawn through valve 18.

While the vaporizing chamber 13 has been described with a degree of particularity it is understood that other forms may be provided. The exterior dimension may be changed to fit in available space under the hood of a particular vehicle and the heat exchange passages and baffle arrangement may be changed in shaping, dimension, and arrangement so long as there is provided a heat exchange flow path of substantial length in a condensed space to vaporize the incoming fuel, recirculation of unvaporized portions and a collection space for liquid portions therein which may be reintroduced in an atomized condition for vaporization thereof.

The control valve 18 may be of various pressure responsive types and as shown includes a housing 51 having inner walls defining a port 52 and a spring biased valve member 53 which will open and close the port in accordance with the suction or pressure at its discharge side produced by the reciprocating action of the piston in the cylinder of the combustion chamber 2.

The throttle body 21 has a venturi portion 54 having a screened aperture 55 in flow relation coupled to the valve 18 so that the suction of the engine chamber will draw in an amount of vaporized fuel and air from intake 22 determined by the setting of a valve into the throttle body 21 and then the combustion chamber 2 in accordance with the requirements of the engine.

The recirculation conduit 23 is disposed in flow communication with an intermediate portion of the chamber and preferably in the side walls and one at approximately in equally spaced relation between the fuel intake 14 and the vapor discharge 19 as shown. An impeller 58 is mounted in a casing coupled in flow relation with conduits 12 and 23 and is driven preferably by an electric motor 59 which will draw in an induced air flow unvaporized portions of the fuel from the chamber which has risen upwardly therein. This impeller is connected as shown in intake line 12 so that the unvaporized portions will recirculate and mix with the incoming fuel mixture from the atomizer 11 and deliver this mixture to the fuel intake 14.

The second atomizer 24 includes a venturi section 61 formed as a part of the discharge end of the intake conduit 12 having a fuel pipe 62 which has a restricted orifice in the venturi secton and extends downwardly into the bottom of the chamber and associated pipe 63 in flow communication with the conduit 12 upstream of the pipe 62 and the pipe 63 so that the induced air flow produced in the intake conduit 12 by impeller 38 and 58 will produce a venturi effect so as to draw the fuel in liquid form up into the venturi section and atomize or change it to a mixture of small particles of fuel suspended in air in an induced air flow for revaporization thereof.

The primer or pump 25 preferably will be some type of pressure-type fuel pump and as shown for purposes of description includes a housing 65 with a ball valve 66 on the intake side and a ball valve 67 on the discharge side with a fuel pipe 68 projecting into the throttle body 21. A reciprocating plunger 69 is mounted within a passage in the housing between the two valves which will reciprocate so as to draw fuel through line 26 from the reservoir supplied by the fuel tank and discharge it into the air flow in the throttle body 21. This pump will operate by a suitable mechanical motive means independently of the other portion of the system to pump fuel into the combustion chamber for starting and acceleration purposes.

While electric motors have been described as a preferred form of drive for impellers 38 and 58 another arrangement is by using a belt or gear driven from the engine 2 to which fuel is being supplied.

From the foregoing it is apparent that the impeller 58 will induce an air flow in the form of a forced draft that will circulate unvaporized portions of the fuel mixture around and around in a cyclic manner through the lower portion of the chamber 13, conduit 23 and downstream portion of the conduit 12 as indicated by the direction of arrows independent of the suction of the combustion chamber so that the fuel will absorb additional heat during each cycle and eventually become vaporized so as to then pass to the upper portion of the chamber which is of sufficient capacity to store the vaporized fuel portion therein. Atomizer 24 reatomizes fuel that has condensed to a liquid state and has flowed back down to the bottom of the chamber.

The upper portion of the chamber 13 above intake conduit 12 stores the vaporized portion of the fuel at pressures in the chambers established by the air being forced into the chamber. Impeller 38 running at a constant speed will deliver a preselected amount of air to the chamber and thereby establish a pressure in the chamber for producing an induced flow of the vaporized portions of the fuel upwardly into the upper storage portion. This stored vaporized fuel is withdrawn or drawn off by the engine intake through the regulator valve.

I claim:

1. A carburetor system for delivering fuel to an engine combustion chamber comprising a heat exchange chamber having an external shape to fit available space adjoining an engine of a self-propelled vehicle, said chamber having inner surfaces for directing an incoming fuel and air mixture through the chamber interior from an intake portion to an outlet portion, and means maintaining said surfaces in heat exchange relation with exhaust gases of the engine, atomizer means inclusive of a first impeller having rotary drive for injecting a fuel mixture suspended in air under pressure into said intake portion of the chamber, said mixture moving in an induced flow from said intake portion to said outlet portion in heat exchange relation with said inner surfaces for vaporizing at least a major portion of the mixture to a gaseous state, conduit means having a second rotary impeller for cyclic withdrawal of unvaporized portions of said mixture at a point intermediate the intake portion and the discharge portion for return into the induced flow entering the intake portion so as to be subjected to more heat exchange action, said conduit means having a second atomizing means at its discharge end in the chamber and actuated by the air flow produced by a least said second impeller for reatomizing fuel in a liquid state collecting in the chamber, the interior space of said chamber above the point of recycle withdrawal being of sufficient volume to store all the vaporized portion of the mixture at the established pressures therein, and valve means responsive to the intake pressure of the engine for controlling the withdrawal of the vaporized mixture through said outlet portion to the combustion chamber of the engine.

2. A carburetor system as defined in claim 1, in which the chamber has exterior heat-conductive walls maintained in contact with exhaust gases passing from the engine, and the return flow of recirculating unvaporized portions are subjected to more heat exchange in their repeated passage through the chamber with the induced flow.

3. A carburetor system as defined in claim 1, means maintaining the vaporized portion of the mixture above the point of withdrawal of unvaporized portions in vapor state by continuing heat exchange action.

4. A carburetor system for delivering fuel to an engine combustion chamber comprising a heat exchange chamber having an external shape to fit available space adjoining an engine of a self-propelled vehicle, said chamber having inner surfaces for directing an incoming fuel and air mixture through the chamber interior from a lower intake portion to an upper outlet portion, and means maintaining said surfaces in heat exchange relation with exhaust gases of the engine, atomizer means inclusive of a first impeller having a rotary drive for injecting a fuel mixture suspended in air under pressure into said lower intake portion of the chamber, said mixture moving in an induced flow from said lower intake portion to said upper outlet portion in heat exchange relation with said inner surfaces for vaporizing at least a major portion of the mixture to a gaseous state, conduit means having a second rotary impeller for cyclic withdrawal of unvaporized portions of said mixture at a point intermediate the intake portion and the discharge portion for return into the induced flow at the intake portion subjected to said heat exchange action, said conduit means having a second atomizing means at its discharge end disposed in the bottom of the chamber and actuated by the air flow produced by at least said second impeller for reatomizing fuel in a liquid state collecting at the bottom of the chamber, the interior space of said chamber above the point of recycle withdrawal being of sufficient volume to store all the vaporized portion of the mixture at the established pressures therein, and valve means responsive to the intake pressure of the engine for controlling the withdrawal of the vaporized mixture through said outlet portion to the combustion chamber of the engine.

References Cited

UNITED STATES PATENTS

| 1,140,064 | 5/1915 | Rakestraw. |
| 1,198,013 | 9/1916 | Dempsey. |
| 1,733,792 | 10/1929 | Good. |
| 1,734,723 | 11/1929 | Gildehaus. |
| 2,323,639 | 7/1943 | Anderson. |

FOREIGN PATENTS

| 688,874 | 5/1930 | France. |

RONALD R. WEAVER, Primary Examiner

U.S. Cl. X.R.

48—144; 123—131; 261—24, 34, 145